United States Patent

[11] 3,607,706

| [72] | Inventors | John L. Eisenmann<br>Hingham;<br>Edward T. Roach, Arlington; Anthony<br>Scieszko, Dorchester, all of Mass. |
|---|---|---|
| [21] | Appl. No. | 660,563 |
| [22] | Filed | Aug. 4, 1967 |
| [45] | Patented | Sept. 21, 1971 |
| [73] | Assignee | Ionics, Incorporated<br>Watertown, Mass. |

[54] METHOD OF MAKING STABLE LAMINATED CATION-EXCHANGE MEMBRANES
9 Claims, No Drawings

[52] U.S. Cl............................................................ 204/296,
204/180, 204/301
[51] Int. Cl............................................................ B01k 3/10
[50] Field of Search............................................ 204/296,
180 P, 301

[56] References Cited
UNITED STATES PATENTS

| 3,356,607 | 12/1967 | Eisenmann | 204/301 X |
| 2,731,411 | 1/1956 | Clarke | 204/180 X |
| 2,730,768 | 1/1956 | Clarke | 204/296 X |
| 2,858,264 | 10/1958 | de Jong | 204/296 |
| 3,276,990 | 10/1966 | Hani | 204/296 |
| 2,972,586 | 2/1961 | Hendrik | 204/180 X |
| 3,004,904 | 10/1961 | Gregor | 204/180 X |

*Primary Examiner*—Daniel E. Wyman
*Assistant Examiner*—Philip M. French
*Attorneys*—Norman E. Saliba and Aaron Tushin

ABSTRACT: A method of making laminated multilayered, reinforced, cation-exchange membranes of a styrene-divinylbenzene, diethylbenzene solvated structure, whereby the organic solvating medium is substituted by equilibration with a polar solvent, such as methanol, before the polymerized structure is sulfonated with concentrated sulfuric acid.

METHOD OF MAKING STABLE LAMINATED CATION-EXCHANGE MEMBRANES

This invention relates to a method of making electrically conductive, solid synthetic organic membranes of ion-exchange polymers. More particularly, the invention is directed to the making of cation-exchange permselective membranes reinforced by a laminate of two or more plies or sheets of backing fabric which membranes do not exhibit delamination during or after the manufacturing process.

Many uses have been found for permselective membranes. One use is the demineralization of water by removing the salts therefrom. Another use is the concentration of dilute spent pickling acids, waste salts, and alkalis, which result as by-products of chemical processes. Still another use is the demineralization of proteins. Another use is the separation of amphoteric ions from nonamphoteric ions, and certain ions from others having different mobility or electronic charges. Another use which has become most important is the decomposition of ionic solutions by electrolysis where it is desired to maintain the decomposition products separate from one another. An important example of the latter is the electrolysis of sodium chloride solution where it is desired to keep the sodium hydroxide which is produced separate from the reactant sodium chloride. Another example is the production of substantially pure carbonates during electrolysis by introducing carbon dioxide into electrolytically produced caustic solutions which are maintained substantially free of chloride ions.

Apparatus employing ion-exchange membranes and their methods of operation to effect the above-mentioned uses are more fully described in U.S. Pat. Nos. Re. 24,865, 2,708,658, 2,826,544, 2,848,403, and many others.

Homogeneous ion-exchange resins have high ionic permselectivity and high hydraulic resistivity. These resins have a solid phase consisting of a synthetic polymer with covalently bonded dissociable ion-exchange groups and mobile replaceable counter-ions associated with them. They are electrically conductive and can be formed into dimensional structures such as sheets or membranes.

It is customary practice in the prior art manufacture of these membranes to employ a nonpolar, organic solvating medium, for example, diethylbenzene, for diluting the monomers such as styrene-divinylbenzene, and also for the purpose of swelling the produced polymer. Equilibration of the polymer with ethylene dichloride as a nonpolar swelling agent was often effected before reacting said polymer with the agent contributing the ion-exchange groups to said polymer. To increase the mechanical strength of the membrane article itself and to allow its manufacture in reasonable large sizes, a reinforcing material is advantageously imbedded therein. The prior art employed a reinforcing or backing structure consisting of a single sheet of a relatively inert material as, for example, glass, Dynel, and the like, generally having a woven or mesh cloth structure. The great majority of the woven materials employed as a backing material are to a large extent hydrophobic and possess chemical and physical properties which are quite different from that of the hydrophilic ion-exchange resin. For this reason, it is believed that a firm bond between the woven backing material and the exchange resin is not always produced and results in a membrane structure having inadequate physical stability over continuous periods of time. This is especially noticeable in the making of the larger size cation-exchange membranes for large-scale commercial usages.

An object of this invention is to produce cation permselective membranes containing a combination of more than one layer of reinforcing material, which is chemically inert to strong concentrated acids, such as concentrated sulfuric acid, wherein degradation, blistering and liquid leakage through said finished membranes are effectively eliminated in its commercial usages.

Another object is to produce homogeneous cation-exchange membranes containing at least two sheets of reinforcing fiber glass fabric, said membranes possessing excellent physical stability and of a size sufficiently large and stable for use in commercial applications.

Another object is to fabricate multilayer reinforced ion-exchange membranes which are mechanically durable, cation permselective, electrically conductive, and substantially hydraulically impermeable for use as liquid separators in the field of electrodialysis.

Other objects, features and advantages of this invention will in part become obvious and will in part become apparent from the following disclosure.

In the prior art, homogeneous ion-exchange membranes were made of a thickness substantially corresponding to that of the imbedded single sheet backing material having a woven or screen-type construction, in which case the interstices of the screen lattice were filled by the ion-exchange resin. Over a period of usage, and most particularly in the case of the sulfonated cation type ion-exchange membranes, the ion-exchange material filling the lattices gradually crumbled away, especially when in contact with hot corrosive solutions or where there were changes in swelling of the ion-exchange resin. In order to avoid these disadvantages, as well as for maintaining its physical strength, attempts were made to make the membranes thicker by employing two or more sheets of screen material as a backing or reinforcing agent. This procedure proved quite unsatisfactory in successful product yields, especially as applied to the making of reinforced cation-exchange membranes of the sulfonated type.

It has not been found that the aforesaid disadvantages, especially as applied to the production of cation-exchange, nonpolar solvated membranes of the sulfonated type, could be obviated by the pretreatment or swelling of the polymer structure in a polar organic solvent prior to sulfonation. This structure before sulfonation may be termed a board and as used herein may be defined as a reinforced film of highly cross-linked components such as, for example, polystyrene. The reinforcement is provided by two or more layers of a support material which is not generally subject to attack by concentrated sulfuric acid, such as woven glass ("Fiberglas"), polytetrafluoroethylene ("Teflon") polypropylene, polyethylene, and the like, on which the polystyrene is cast and wherein the solvating medium therein is preferably a nonpolar type organic solvent. The solvating medium is selected from the class that is nonpolymerizable and soluble with the monomer mix and includes, for example, diethylbenzene, dibromoethane, diethylene glycol dimethyl ether (diglyme), dichlorodimethyl ether, ethylene dichloride, and the like. The microporosity of the polymer structure may be controlled by varying the quantity of nonpolymerizable organic solvent (30 percent to 65 percent by volume). The cross linking may be varied by adjusting the quantity of divinylbenzene in the polystyrene formulation. It will be apparent that the boards are not endowed with ion-exchange characteristics of either change since no ion-exchange active groups have been attached thereto as of this time. The boards, however, are the base material from which either cation or anion-exchange membranes may be obtained by the well-known chemical treatment of the same to introduce known positive or negative ion-exchange groups.

In the past, it was found that reinforced laminated boards for conversion into cation-exchange membranes by sulfonation were made with nonpolar solvating mediums, such as diethylbenzene, which was often equilibrated with ethylene dichloride as a swelling agent before sulfonation. However, when such laminated boards were sulfonated with concentrated sulfuric acid, the resulting membranes were found unsatisfactory in yield in that spalling, blistering, delamination and other physical damage resulted either during manufacture or shortly thereafter.

Illustrative of the type and class of homogeneous ion-exchange membranes which may be reinforced by the process of the present invention are those disclosed in U.S. Pat. No. 2,731,411 issued on Jan. 17, 1956 to John T. Clarke.

For producing cation sulfonated membranes, laminated boards containing a plurality of reinforcing sheets were found to possess improved physical properties over single-ply reinforced membranes. These improved properties over single-ply reinforced membranes, even when of the same overall thickness, include such improvements as greater rigidity, less tendency to pin hole leakage, cracking or tearing, and ability to withstand rougher handling.

The boards of the present invention are formed on the supporting sheet fabrics by placing two or more sheets on a flat casting surface on top of one another in the arrangement desired. The mixture of nonpolymerizable solvating medium and polymerizable components or partially polymerized components are poured over the support material, covered with the cast and then mass-heated until polymerization is complete. For example, the mixture of polymerizable ingredients may be cast between parallel glass plates spaced from each other for a distance equal to the desired board thickness and then retained in a heated oven for a time sufficient to cause polymerization. During the polymerization, evaporation of any of the polymerizable material from the space between the glass plates occurs only at the edge of the cast. The dried edge will then seal the interior of the cast from additional evaporation of polymerizable material. After polymerization and cooling, the dried rough edges that form around the rim of the glass casts are trimmed off and discarded. The boards may then be removed from between the glass plates and further treated as may be desired. In making a reinforced membrane, the casting or molding method (including compression molding) is preferred but other conventional methods such as dipping, either batchwise or continuously, and multicoating may be employed.

According to the present invention, the boards made with nonpolymerizable organic solvating mediums, are hung on a suitable rack and equilibrated (swelled) for many hours in a polar, water-soluble organic solvent such as substantially pure methanol, dioxane, "Sulfolane" (tetrahydrothiophene-1,1-dioxide), and so forth. The boards may be equilibrated for an additional approximate period of several hours in a second fresh solution of substantially pure polar solvent. The boards are then removed from the polar solvent, drained and placed in fresh, concentrated sulfuric acid for sufficient time for the boards to become sulfonated to the degree that the cation-exchange capacity is preferably about 2.0 milliequivalents per dry gram of resin. Concentrated sulfuric acid is meant to include technical grade (98 percent or better) or reagent grade which is at least 95 percent aqueous sulfuric acid. The swelling of the boards in the polar water-soluble, organic solvent prior to sulfonation must be carried out so that there is less than 5 percent contamination of nonpolar organic solvent (diethylbenzene) in said polar solvent which at such concentration and for our purposes may be considered as substantially pure. Sulfonation may be carried out using fresh, concentrated reagent or technical grade sulfuric acid and at temperatures between about 18° C. to about 50° C. The sulfonated boards are then removed from the sulfuric acid and placed in about 18N (50percent) aqueous sulfuric acid for several additional hours. The post treatment in the aqueous sulfuric acid serves to condition the produced membranes and thus avoid spalling when the membranes are finally placed in water.

The following examples have been selected for purpose of illustration and are not presented to suggest limitations not previously described and not included in the appended claims.

The divinylbenzene (DVB) used in manufacture of the boards of the following examples is the commercial grade which is obtainable in several concentrations. The actual analysis of the grades as produced by the manufacturer and used herein are given below:

| Designation of DVB | | | |
|---|---|---|---|
| | 20%–25% | 40%–50% | 50%–60% |
| Divinylbenzene—% by weight | 17 | 47 | 53 |
| Ethylstyrene—% by weight | 49 | 43 | 39 |
| Diethylbenzene—% by weight | 34 | 10 | 8 |

EXAMPLE 1

The board structure (38 inches × 42 inches) was made in accordance with standard procedure as disclosed hereinbefore employing a two-ply layer of glass woven cloth ("Fiberglas") as the reinforcing material with diethylbenzene as the nonpolymerizable, nonpolar solvating medium for the styrene-divinylbenzene polymer structure. The board was then placed in technical grade methanol for several hours. The board was then removed and placed in fresh methanol for several more hours of equilibration for removal and substitution of the original nonpolar diethylbenzene solvent with methanol as the solvating medium. The board was then placed in fresh, concentrated reagent grade sulfuric acid (95 percent to 98 percent) at about 50° C. for about 18 hours. After removal from the acid, the sulfonated board was placed in freshly prepared 50 percent by volume of aqueous sulfuric acid for at least one hour after which it was removed, drained and placed in water for storage. The two-ply cation-exchange membrane so produced remained undelaminated, hydraulically leaktight, had a cation-exchange capacity of at least 1.5 milliequivalent per dry gram of resin, a specific resistance of less than 300 ohm-cm., a thickness of about 0.1 cm., and a water content of from 40 percent to 50 percent based on the wet resin weight.

EXAMPLE 2

The same procedure for making the board and sulfonating the same was followed in accordance with that of Example 1, with the exception of substituting 1,4-dioxane for the methanol as the polar organic solvent. Also, the reinforcing material comprised woven polypropylene cloth in place of the Fiberglas. Substantially the same result of an undelaminated cation-exchange membrane was obtained having generally the same physical and chemical properties as those of Example 1.

EXAMPLE 3

The procedure above of Example 1 was again followed substituting Sulfolane (tetrahydrothiophene-1,1-dioxide) for the methanol solvent and technical grade $H_2SO_4$ at sulfonating temperatures of 18° C. to 22° C. This produced the same favorable results as indicated in said Example 1.

EXAMPLE 4

In this case, three boards 9 × 10 were made with diglyme (diethylene glycol dimethyl ether) which was substituted for the diethylbenzene nonpolar organic solvent of Examples 1, 2 and 3, respectively. The two-ply boards were equilibrated with the polar solvents methanol, 1,4-dioxane and Sulfolane, respectively, and then sulfonated in accordance with the procedure of Example 1. The cation-exchange membranes produced were all undelaminated and had water contents between 35 percent and 45 percent by weight based on wet resin weight. All other properties were substantially the same as that of Example 1.

EXAMPLE 5

The board in this example was a three-ply board, otherwise the same as that of Example 1. The procedure for making the cation-exchange membrane from the three-ply board was the same as that of Example 1. The product of this sulfonation was an undelaminated cation-exchange membrane having a thickness of about 0.15 cm. and a specific resistance less than 400 ohm-cm. All its other properties were the same as that of Example 1.

EXAMPLE 6

The boards in this example were three-ply boards, otherwise the same as that of Example 4. The same procedure was followed in each case as that of Example 4. The products were three-ply undelaminated cation-exchange membranes with a thickness of about 0.15 cm. and a specific resistance less than 400 ohm-cm. Otherwise, all their other properties were about the same as those of Example 4.

From the examples hereinbefore noted, it will be apparent that (1) the swelling of the laminated boards, such as two- or three-ply, should be carried out in polar, water-soluble, organic solvents containing less than 5 percent of a nonpolar organic solvent such as diethylbenzene; (2) sulfonation may be carried out using fresh, concentrated, reagent grade sulfuric acid at a concentration of 95 percent or greater at temperatures from about 18° C. to about 50° C.; (3) sulfonation may also be carried out using fresh, concentrated, technical grade sulfuric acid at a concentration of 98 percent or greater at a temperature of 20° C. ± 2° C.; (4) nonpolar organic solvents must be excluded from the reagents used for swelling or sulfonating the resin. Under these conditions, a yield approaching 100 percent of undelaminated, hydraulically leaktight membranes having two or more layers of reinforcing fabric and having the properties described in the examples have been obtained repeatedly in sizes up to 38 × 42.

We claim:

1. In the method of making an electrically conductive, homogeneous, laminated cation-exchange membrane of a copolymer of divinyl benzene and styrene having a plurality of reinforcing sheets of fabric material imbedded therein, the improvement comprising forming a board structure by polymerizing said vinyl monomers in a nonpolar, nonpolymerizable organic solvating medium selected from the group consisting of diethylbenzene, dibromoethane, diethylene glycol dimethyl ether, dichlorodimethyl ether and, ethylene dichloride; with at least two layers of said reinforcing material imbedded therein, equilibrating said polymerized structure with a water soluble organic solvent selected from the group consisting of methanol, dioxane and, tetrahydrothiophene-1,1-dioxide; thereby substantially replacing said nonpolar, nonpolymerizable organic solvating medium, reacting the structure with a concentrated sulfonating acid, and thereafter equilibrating the formed cation-exchange membrane in an aqueous medium, whereby the delamination of the resulting laminated membrane is reduced or substantially eliminated.

2. The method of claim 1 wherein the sulfonating acid is reagent grade sulfuric at a concentration of at least 95%.

3. The method of claim 1 wherein the sulfonating acid is technical grade sulfuric at a concentration of at least 98%.

4. The method of claim 2 wherein the sulfonation of the structure is effected at temperatures in the range of about 18° C. to about 50° C.

5. The method of claim 3 wherein the sulfonation of the structure is effected at temperatures in the range of about 18° C. to about 22° C.

6. The method of claim 1 wherein the reinforcing woven fabric is selected from the group consisting of glass, polytetrafluoroethylene, polypropylene, and polyethylene.

7. The method of claim 1 wherein the nonpolar, nonpolymerizable organic solvating medium is diethylbenzene, the equilibrating water soluble organic solvent is substantially pure methanol, and the concentrated acid is sulfuric acid.

8. The method of claim 1 wherein the board structure is first equilibrated with a polar solvent of methanol for a period of several hours, equilibrated a second time in fresh methanol for several additional hours, reacted with concentrated sulfuric acid for a period of about 40 hours at a temperature of about 20° C., reacted again with freshly prepared 50% by volume of aqueous sulfuric acid for at least one hour, and finally rinsed in water.

9. A cation-exchange membrane prepared by the method of claim 1.